R. R. RUST.
PIPE COUPLING.
APPLICATION FILED JUNE 1, 1917.

1,262,263.

Patented Apr. 9, 1918.

Inventor
Robert R. Rust
By his Attorney
Clarence Kerr

UNITED STATES PATENT OFFICE.

ROBERT R. RUST, OF NEW YORK, N. Y., ASSIGNOR TO THE CENTRAL FOUNDRY COMPANY, OF NEW YORK, N. Y., A CORPORATION OF MAINE.

PIPE-COUPLING.

1,262,263.  Specification of Letters Patent.  Patented Apr. 9, 1918.

Application filed June 1, 1917. Serial No. 172,146.

*To all whom it may concern:*

Figure 1:
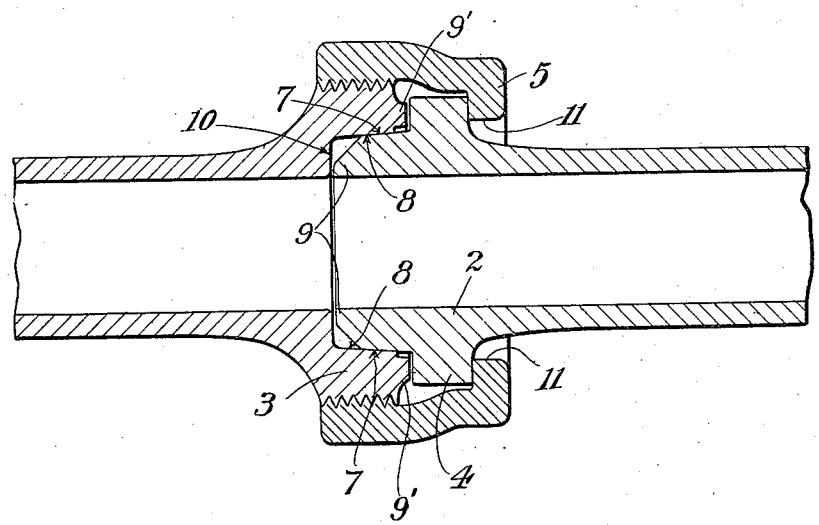
Figure 2:
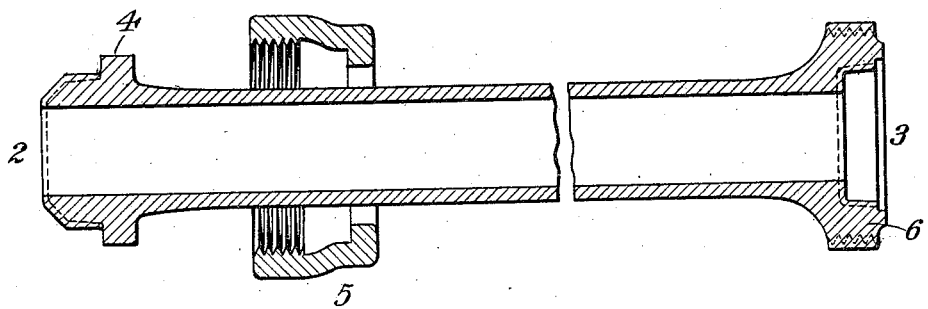

Be it known that I, ROBERT R. RUST, a citizen of the United States, and a resident of the city of New York, borough of Manhattan, in the county and State of New York, have invented new and useful Improvements in Pipe-Couplings, of which the following is a specification, reference being had to the accompanying drawings, in which:

Figure 1 shows a section of a pipe joint embodying my invention, and Fig. 2 is an elevation of a pipe section thereof.

My invention relates to joints for cast iron pipe and is particularly designed to overcome disadvantages which have been found in practice in pipe of the character shown in the Dean Patent No. 816,155. In cast iron pipe of this type it has been found that when the expansion is undue, there is a tendency for the expansion to concentrate at some particular joint, with the result that at such joint the spigot is forced into the faucet to such an extent that the hub of the faucet section cracks through. My invention consists in providing a bearing or guard, which will prevent the spigot end from being forced into the hub end to such an extent, in providing a full bearing for the securing means at each end of a pipe section, which also act as reinforcements for the pipe ends, and in the application of the coupling nut to each pipe section.

Referring to the drawings, 2 indicates the spigot end of a pipe section, and 3 the faucet end of an adjacent pipe section. Each end has an exterior annular reinforcement, the reinforcement 4 on the spigot end providing a bearing for the coupling nut 5, and the reinforcement 6 of the faucet end 3 is suitably threaded for engagement with the inner threaded surface of the coupling nut 5. The bearing face 7 of the spigot end is machined at 2 degrees from the horizontal, and the corresponding inner bearing face 8 of the faucet end is machined at 2½ degrees from the horizontal. The spigot end is also provided with a forwardly-extending stop 9 which, when adjacent sections are connected together, is preferably just out of bearing against the shoulder 10 of the faucet end, so that when undue expansion occurs the stop 9 will engage the shoulder 10 and prevent the spigot end from being forced into the faucet end to such an extent that the faucet end will crack through. The faucet end may likewise be equipped with a stop 9', which, under expansion, will bear against the reinforcement 4 on the spigot end, and also prevent the spigot from being forced into the faucet end to too great an extent. The annular reinforcements 4 and 6 also serve to strengthen the spigot and faucet ends, respectively, and protect them against bursting strains.

As the exterior diameters of the reinforcements 4 and 6 are greater than the diameter of the throat 11 of the coupling nut, the parts are assembled by first casting the nut, then placing the nut in the mold or flask, and finally by casting the pipe section inside of the nut. In Fig. 2 the pipe section is shown immediately after casting, the portions to be machined being shown in dotted lines.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In cast iron pipe, a joint which consists of two pipe sections, the bearing face on the spigot being of less divergence from the horizontal than that of the coöperating face on the faucet, the spigot having a forward projection adapted to engage a shoulder at the rear of the bearing face on the faucet, to prevent the spigot from being forced too far into the faucet, and means for drawing the said sections together.

2. In cast iron pipe, a joint which consists of two pipe sections and a cast iron coupling nut, each pipe section having at its ends integral annular reinforcements of greater diameter than the internal diameter of the coupling nut, the coupling nut being incapable of removal over either end of its pipe section, and means on reinforcements on adjacent sections coöperating with the coupling nut for drawing the sections together.

3. In cast iron pipe, a joint which consists of two pipe sections the bearing face on the spigot being of less divergence from the horizontal than that of the coöperating face on the faucet, a projection on one of the sections adapted to engage a shoulder at the rear of the bearing face on the other section, to prevent the spigot from being forced too far into the faucet, and means for drawing the said sections together.

ROBERT R. RUST.

Copies of this patent may be obtained for five cents each, by addressing the "Commissioner of Patents, Washington, D. C."